(12) United States Patent
Rautio et al.

(10) Patent No.: US 12,179,155 B2
(45) Date of Patent: Dec. 31, 2024

(54) DEVICE FOR BIND AND ELUTE CHROMATOGRAPHY USING MEMBRANES, AND METHOD OF MANUFACTURE

(71) Applicant: Merck Millipore Ltd., Carrigtwohill (IE)

(72) Inventors: Kevin Rautio, Manchester-by-the-Sea, MA (US); Sean Foley, Marlborouh, MA (US); Stephen G. Hunt, North Billerica, MA (US); Bumchul Lee, Bedford, MA (US); Nathan Landry, Burlington, MA (US)

(73) Assignee: EMD Millipore Corporation, Burlington, MA (US)

( * ) Notice: Subject to any disclaimer, the term of this patent is extended or adjusted under 35 U.S.C. 154(b) by 592 days.

(21) Appl. No.: 17/432,122

(22) PCT Filed: Feb. 20, 2020

(86) PCT No.: PCT/US2020/018947
§ 371 (c)(1),
(2) Date: Aug. 19, 2021

(87) PCT Pub. No.: WO2020/172354
PCT Pub. Date: Aug. 27, 2020

(65) Prior Publication Data
US 2022/0032235 A1  Feb. 3, 2022

Related U.S. Application Data

(60) Provisional application No. 62/807,937, filed on Feb. 20, 2019, provisional application No. 62/932,722, filed on Nov. 8, 2019.

(51) Int. Cl.
*B01D 63/08* (2006.01)

(52) U.S. Cl.
CPC ......... *B01D 63/084* (2013.01); *B01D 63/081* (2013.01); *B01D 2313/042* (2022.08)

(58) Field of Classification Search
CPC .......... B01D 2313/04; B01D 2313/042; B01D 63/081; B01D 63/084
See application file for complete search history.

(56) References Cited

U.S. PATENT DOCUMENTS 4,219,421 A * 8/1980 Knibbs ................. B01D 61/22
                                                       210/98
5,084,220 A    1/1992 Moller
(Continued)

FOREIGN PATENT DOCUMENTS

CN       1721033 A     1/2006
CN     106999829 A     8/2017
(Continued)

OTHER PUBLICATIONS

Office Action received for Korean Patent Application No. 10-2021-7029957 mailing date Oct. 20, 2023, 9 Pages (4 Pages of English translation & 5 Pages of official copy).
(Continued)

*Primary Examiner* — Dirk R Bass
(74) *Attorney, Agent, or Firm* — EMD Millipore Corporation

(57) ABSTRACT

Single-use integral chromatography unit having an inlet and an outlet, and comprising one or more plates or pairs of filter plates interposable between a pair of end plates. In certain embodiments, each of the filter plates comprises a polymeric framework with one or more membranes supported therein. The filter plates and end plates may be assembled to form a substantially fixed, substantially water-tight, integral stack. Fluid entering the unit through a common inlet passes the membrane or membranes of each filter plate substantially contemporaneously prior to exiting the unit through a com-
(Continued)

mon outlet (cf, "parallel" flow). The assembly is a modular design, as multiple pairs of plates can be stacked in a suitable holder to form a single chromatography unit.

7 Claims, 6 Drawing Sheets

(56) References Cited

U.S. PATENT DOCUMENTS

| | | | |
|---|---|---|---|
| 5,429,742 A * | 7/1995 | Gutman | B01D 63/081 210/489 |
| 7,316,919 B2 | 1/2008 | Childs et al. | |
| 8,187,880 B2 | 5/2012 | Childs et al. | |
| 8,192,971 B2 | 6/2012 | Childs et al. | |
| 8,206,958 B2 | 6/2012 | Childs et al. | |
| 8,206,982 B2 | 6/2012 | Childs et al. | |
| 8,211,682 B2 | 7/2012 | Childs et al. | |
| 8,367,809 B2 | 2/2013 | Childs et al. | |
| 8,383,782 B2 | 2/2013 | Childs et al. | |
| 8,652,849 B2 | 2/2014 | Childs et al. | |
| 8,916,045 B2 | 12/2014 | Reinbigler et al. | |
| 2004/0226875 A1 | 11/2004 | Bartlett et al. | |
| 2005/0279694 A1 | 12/2005 | Straeffer et al. | |
| 2005/0279695 A1 | 12/2005 | Straeffer et al. | |
| 2005/0280178 A1 | 12/2005 | Stankowski et al. | |
| 2005/0280179 A1 | 12/2005 | Stankowski et al. | |
| 2018/0236378 A1 | 8/2018 | Ghosh et al. | |

FOREIGN PATENT DOCUMENTS

| | | |
|---|---|---|
| EP | 0322604 A1 | 7/1989 |
| EP | 3388142 A1 | 10/2018 |
| JP | H103-504459 A | 10/1991 |
| JP | H05-96108 A | 4/1993 |
| JP | 106-262044 A | 9/1994 |
| JP | 2006-000848 A | 1/2006 |
| JP | 2006-524122 A | 10/2006 |
| JP | 2007-125497 A | 5/2007 |
| JP | 2008-503333 A | 2/2008 |
| JP | 2013-534822 A | 9/2013 |
| JP | 2014-509521 A | 4/2014 |
| JP | 2015-522019 A | 8/2015 |
| JP | 2016-077190 A | 5/2016 |
| JP | 2018-176161 A | 11/2018 |

OTHER PUBLICATIONS

Office Action received for Japanese Patent Application No. 2021-548695 mailing date Sep. 12, 2023, 9 Pages (4 Pages of English translation & 5 Pages of official copy).
Communication pursuant to Article 94(3) EPC received for European Patent Application No. 20715517.7 mailing date Oct. 4, 2023, 5 Pages.
Office Action received for Japanese Patent Application No. 2021-548695 mailing date Mar. 28, 2023, 11 Pages (6 Pages of English translation & 5 Pages of Official copy).
Office Action received for Korean Patent Application No. 10-2021-7005800, mailed on Jul. 17, 2022, 17 Pages (8 Pages of English Translation & 9 Pages of Official Copy).
First Examination Report received for Indian Application No. 202117001130 mailed on Sep. 5, 2022, 6 Pages.
Office Action received for Japanese Patent Application No. 2021-504341, mailed on Mar. 29, 2022, pp. 10 (6 Pages of English Translation & 4 Pages of Official Copy).
Office Action received for Japanese Patent Application No. 2021-548695, mailed on Oct. 4, 2022, 14 Pages (7 Pages of English Translation & 7 Pages of Official Copy).
First Examination Report received for Indian Application No. 202117037586 mailed on Mar. 8, 2022, 6 pages.
Office Action received for Canadian Patent Application No. 3,130,894 mailed on Apr. 5, 2022, 3 pages.
International Search Report received for PCT Patent Application No. PCT/US2020/018947 mailed on Aug. 12, 2020, 4 pages.
Office Action received for Chinese Patent Application No. 202080025462.2 mailing date Aug. 24, 2023, 11 Pages (6 Pages of English translation & 5 Pages of Official copy).
Invitation to Respond to Written Opinion received for Singapore Application No. 11202108970V, mailed on Dec. 8, 2022, 6 Pages.
Office Action received for Korean Patent Application No. 10-2021-7029957 mailing date Apr. 3, 2023, 14 Pages (6 Pages of English Translation & 8 Pages of Official Copy).
Office Action received for Chinese Patent Application No. 202080025462.2 mailing date Feb. 16, 2023, 16 Pages (08 Pages of English translation and 08 Pages of official copy).
Office Action received for Chinese Patent Application No. 202080025462.2 mailing date Feb. 1, 2024, 17 Pages (9 Pages of English Translation & 8 Pages of Official Copy).
Office Action received for Canadian Patent Application No. 3, 130,894 mailing date Mar. 14, 2024, 3 Pages.
Office Action received for Korean Patent Application No. 10-2021-7029957 mailing date Feb. 23, 2024, 11 Pages (5 Pages of English Translation and 6 Pages of Official copy).
Hao, Chen, "Case Analysis and Application of Frequency Converter", National Defence Industry Press, 2009, 4 Pages.

* cited by examiner

DEVICE FOR BIND AND ELUTE CHROMATOGRAPHY USING MEMBRANES, AND METHOD OF MANUFACTURE

CROSS-REFERENCE TO RELATED APPLICATIONS

This application is the US National Stage of International Application No. PCT/US2020/018947, filed on Feb. 20, 2020, which claims the benefit of priority to U.S. Provisional Patent Application Nos. 62/807,937, filed Feb. 20, 2019 and 62/932,722, filed Nov. 8, 2019. All previous applications are hereby incorporated by reference in their entirety.

FIELD

In general, the present disclosure is directed to chromatography units, and in particular, to a disposable or single-use chromatography devices through which fluid flows through one or more plate devices or pairs of plate devices with applications including membrane based bind/elute chromatography.

BACKGROUND

Good manufacturing practices and governmental regulations are at the core of many biopharmaceutical manufacturing process. Such manufacturing processes must often undergo mandated, often lengthy and costly validation procedures. For example, the equipment used for the separation and purification of biopharmaceutical products must, for obvious reasons, meet stringent cleanliness requirements. For a single piece of equipment, the associated and reoccurring cost of a single cleaning validation may readily exceed multiple thousands of dollars. To reduce such cleaning validation costs and expenses, and/or to reduce the occasions when cleaning is needed or required, the pharmaceutical and biotech industries are increasingly exploring pre-validated modular, disposable solutions.

Along these lines, there is considerable interest of late in developing a disposable solution to the primary and/or secondary clarification of industrial, laboratory and clinical volumes of raw, pharmaceutically synthesized fluids (e.g., cell cultures). The high-volume, high-throughput requirements of such processes generally favor the use of costly, installed stainless steel apparatus, wherein replaceable cassettes or cartridges (e.g., typically comprising stacks of lenticular filter elements) are installed within a stainless steel housing or like receptacle. At the conclusion of a filtration operation, and removal of the spent cassette or cartridge, the apparatus has to be cleaned and validated, at considerable cost and effort, prior to being used again.

Membrane based devices designed for use in the biopharmaceutical processing industry are typically constructed of all thermoplastic components. This is desirable because the thermoplastics of choice (e.g., polypropylene, polyethylene, polyethersulphone, etc.) are stable in the chemicals and environment they are exposed to. One negative aspect of all thermoplastic devices that utilize secondary molding operations during manufacture is shrinkage. As the thermoplastic cools, it shrinks, thus warping the membrane and creating undesirable voids.

More specifically, thermoplastic filtration devices have been conventionally manufactured using an over-molding step where, a "window frame" of thermoplastic (typically polypropylene) is injection molded around the periphery of a rectangular piece of membrane or media, then a bonding step (vibration, hotplate, etc.) is used to attach the subassemblies and, finally, endcaps are welded in a similar fashion. In flow-through applications where the separation mechanism is either size exclusion or charge based, the additional void inside the device that is created by the "window frame" shrinking as it cools (and wrinkling the membrane or media), does not negatively affect the device performance. However, in bind and elute mode applications for capture in a chromatography train, any additional void created by a wrinkled membrane will reduce the performance of the device. This performance reduction can be seen in the sharpness of the breakthrough curve and in the efficiency of the elution.

In addition, it is important to create an integral seal of the membrane in the device even when wet or semi-wet membranes are used.

It therefore would be desirable to have a bind and elute device using one or more membranes coupled with a desired ligand (e.g., Protein A ligand) that remain flat and void-free, and sealed in the device.

For further understanding of the nature and these and other objects of the present invention, reference should be had to the following description considered in conjunction with the accompanying drawings.

SUMMARY

Problems of the prior art have been addressed by embodiments disclosed herein, which relate to a disposable or single-use integral chromatography unit having an inlet and an outlet, and comprising one or more plates or pairs of filter plates interposable between a pair of end plates. In certain embodiments, each of the filter plates comprises a polymeric framework with one or more membranes supported therein, which may include screens or spacers that separate each layer of membrane. The filter plates and end plates may be assembled to form a substantially fixed, substantially watertight, integral stack. Fluid entering the unit through a common inlet passes the membrane or membranes of each filter plate substantially contemporaneously prior to exiting the unit through a common outlet (cf., "parallel" flow). The assembly is a modular design, as multiple pairs of plates can be stacked in a suitable holder to form a single chromatography unit.

Also disclosed are methods of manufacturing such filter plates and chromatography units.

In some embodiments, a filter plate having an inlet and an outlet is disclosed, the filter plate comprising a polymeric framework having a filtration zone and one or more membranes bonded to the polymeric framework in the filtration zone with a thermosetting plastic. The polymeric framework may comprise a polyphenylene ether/polystyrene blend. A plurality of stacked membranes may be provided in the filtration zone, and the thermosetting plastic may bond the perimeter of the membrane or membranes to the polymeric framework such as via an injection molding process.

More specifically, in certain embodiments, an epoxy or thermoset may be used to bond one or more membranes to the polymeric framework. Thus, the secondary thermoplastic molding operation that would warp device and produce voids has been replaced with an epoxy or thermoset that results in an integral bond, sealing the membrane or membranes without shrinkage and warpage. Devices built in this manner maximize membrane volume and do not diminish the performance of the base membrane(s) in terms of dynamic binding capacity, residence time or elution efficiency.

The "parallel" flow path through the membrane or membranes promotes use of the unit for chromatography applications, including bind/elute chromatography operations of, for example, biopharmaceutical fluids. In a preferred embodiment, the unit is comparatively small and has compact—desirable structural characteristics that promote easier installation and handling as compared with the typical, bulkier units currently in widespread use. The unit is configured such that no external housing is required for its use in chromatography operations. The unit can be installed directly within a fluid process stream. When spent, the unit may be removed and replaced with a fresh one.

By injection molding the "window frame" or, a full rectangular plate first, allowing the molded component to fully cool and shrink, then assembling the membrane or stack of membranes into the plate and completing the adherence and sealing of the membrane to the plate with a material that is not subject to cooling and shrinking (e.g., an epoxy or thermoset), the problem of loss of device performance due to an uneven or wrinkled membrane is resolved.

Thus, disclosed is a membrane-based bind and elute chromatography unit or device wherein the membrane or stack or layers of membranes remains flat and uniform in the device to minimize voids, thereby maximizing the membrane volume of the device.

In certain embodiments, disclosed is a filter plate having an inlet and an outlet, the filter plate comprising a polymeric framework having a filtration zone and one or more membranes bonded or adhered to the polymeric framework in the filtration zone with a thermosetting plastic. In certain embodiments, the polymeric framework comprises a thermoplastic material. Preferably the polymeric framework comprises a resin to which the thermoset used to bind the membrane(s) adheres well. In certain embodiments, there are a plurality of stacked or layered (preferably coextensively) membranes in the filtration zone, e.g., a stack of five membranes. In certain embodiments, each membrane within the stack is the same, e.g., each has the same chemistry and performance characteristics or rating. In certain embodiments, each membrane within the stack is varied with different chemistry or performance characteristics in order to obtain a specific performance characteristic for the integral stack and resulting filter unit. In certain embodiments, the one or more membranes has a perimeter, and the thermosetting plastic bonds or otherwise adheres the perimeter to the polymeric framework in sealing relation. In certain embodiments, each filter plate comprises a plurality of apertures in fluid communication with the outlet, and the apertures are positioned such that during a chromatography operation, filtrate through the membrane or membranes enters the apertures and flows to the outlet.

In some embodiments, disclosed is an integral unit having an inlet and an outlet, and comprising at least one filter plate or at least one pair of filter plates interposed between a pair of end plates; each of the filter plates within the at least one filter plate or pair of filter plates comprising a polymeric framework having a filtration zone and one or more membranes bonded to the polymeric framework in the filtration zone with a thermosetting plastic; the at least one filter plate or pair of filter plates and end plates forming a substantially fixed integral stack, wherein fluid entering the disposable integral unit through the inlet passes through the one or more membranes in each filter plate prior to exiting the unit through the outlet. The filter plates of the at least one pair of filter plates may be positioned in back-to-back relation thereby creating a channel between the membrane or membranes in a first plate of said pair and the membrane or membranes in a second plate of said pair, into which fluid flows from the inlet and exits through the outlet after passing through the membrane or membranes in each of the first and second plates.

DETAILED DESCRIPTION

Figure 1:
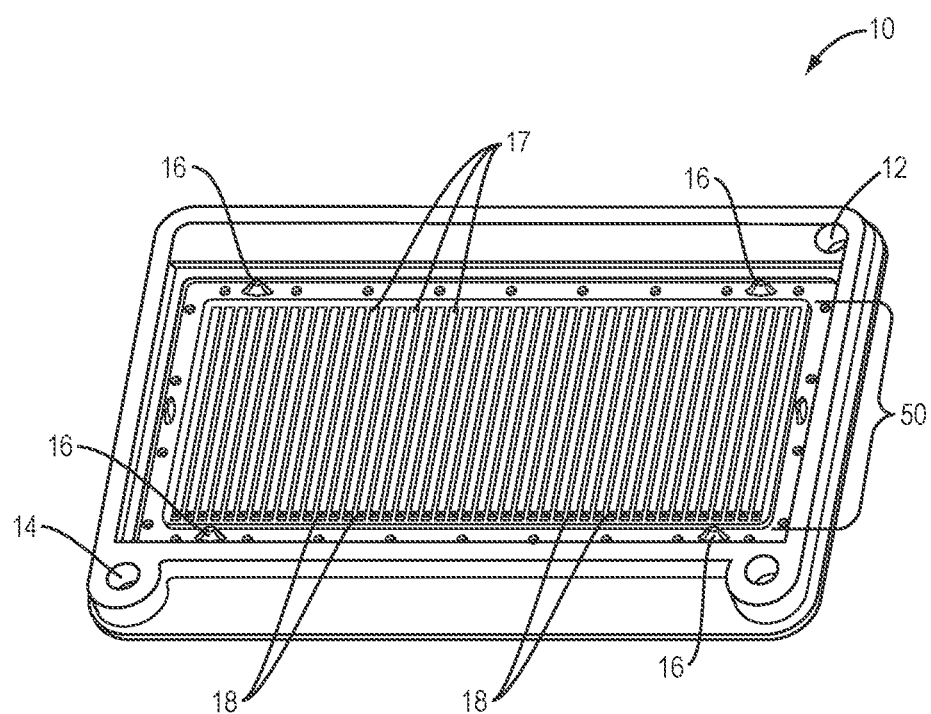
FIG. 1 is a perspective view of a flat plate device, shown without a membrane, in accordance with certain embodiments.

Turning now to FIG. 1, there is shown a plate 10 in accordance with certain embodiments. The plate 10 may be have a generally rectangular shape and is preferably made of a polymeric material to which the thermoset used to adhere the membrane or membranes adheres well to, and which itself is heat weldable so that pairs of plates can be bonded together. Suitable polymeric materials include resins such as amorphous blends of polyphenylene ether and polystyrene commercially available from SABIC, such as NORYL resin HNA033, which is a non-reinforced blend of polyphenylene ether and high impact polystyrene. Epoxy bonds well to these resins, which enables the use of low shrink materials and a membrane that is not dry. They also have the necessary cleanliness, caustic and solvent resistance required for biopharmaceutical applications. For example, at a shrink rate of about 0.5%, a plate made of this resin that is 12 inches wide will move about 0.06", resulting in a plate that is 11.94". The resulting voids in the membrane packet with this movement are minimal. The same plate in polypropylene would move about 0.2" which would result in inefficiencies in the device (elution volumes would be higher).

Figure 2:
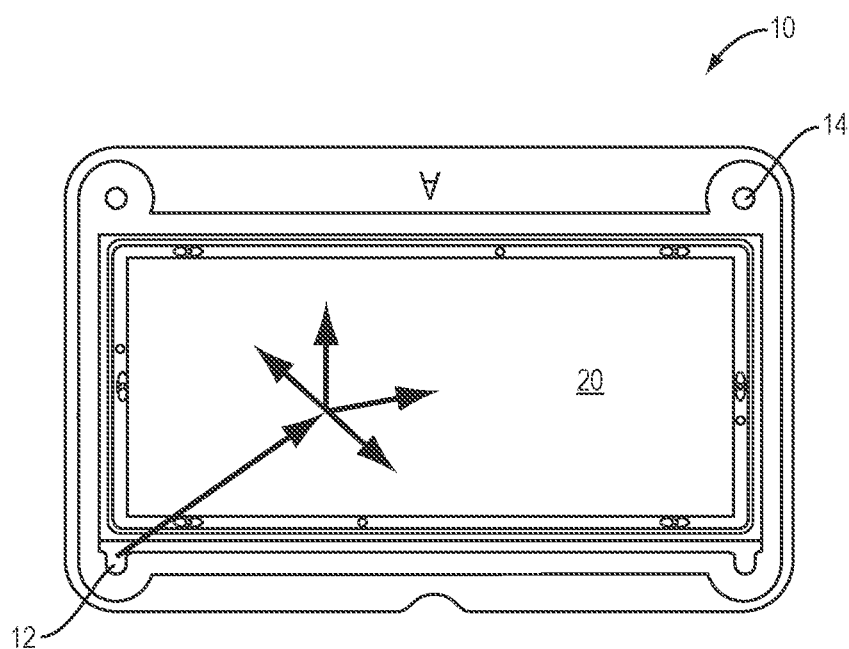
FIG. 2 is a top view of a flat plate device shown with a membrane, in accordance with certain embodiments.
Figure 3:
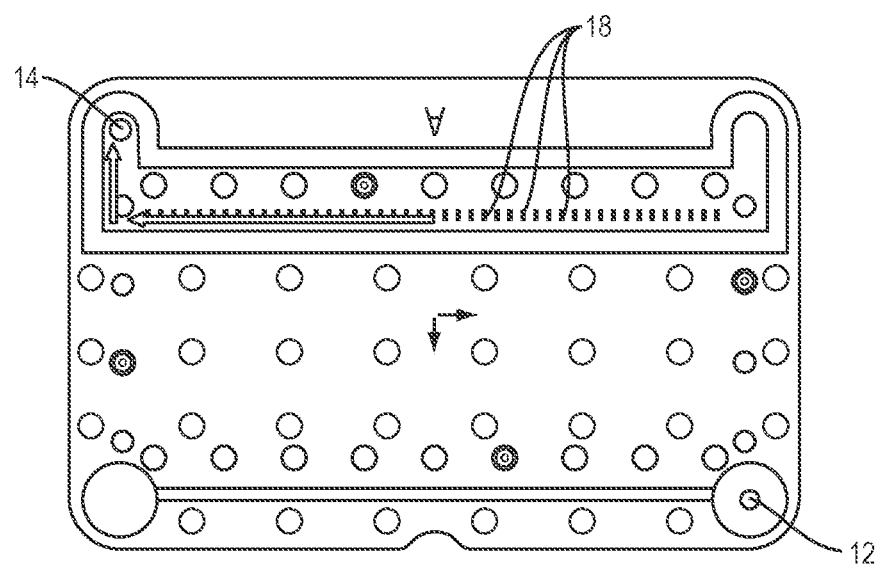
FIG. 3 is bottom view of a flat plate device in accordance with certain embodiments.
Figure 6:
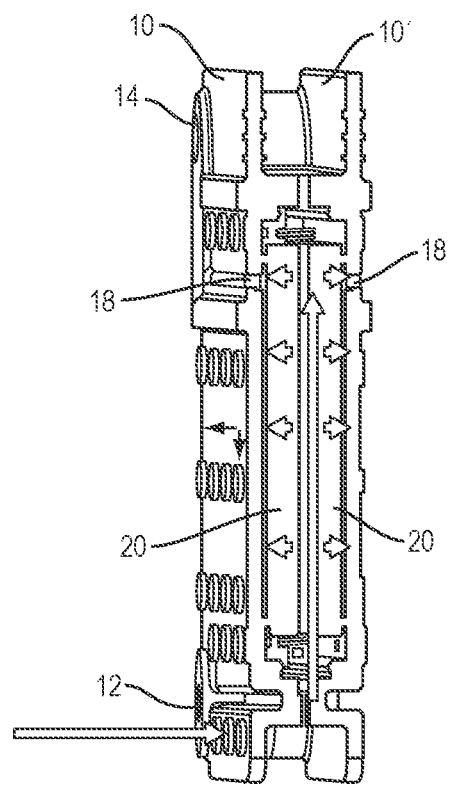
FIG. 6 is a cross-sectional view of a pair of flat plates in accordance with certain embodiments.

In certain embodiments, each plate 10 includes a fluid inlet or feed port 12 and a fluid outlet or filtrate port 14 spaced from the fluid inlet 12. When pairs of plates 10 are assembled, the inlets 12 and outlets 14 of each plate align and define respective common inlets and outlets of the assembly. One or more location prongs 16 (four shown, two each on each side of filtration zone 50) may be provided to properly locate the membrane or membranes 20 on the device. A plurality of spaced ribs 17 may be provided in filtration zone 50 to support the membrane or membranes and provide flow passageways to channel fluid towards a plurality of apertures 18 which are in fluid communication with outlet 18, once the fluid passes through the membrane or membranes 20 as shown by the arrows in FIGS. 2 and 6. In certain embodiments, the apertures 18 are linearly aligned. In certain embodiments, the apertures 18 are all similarly shaped, are regularly spaced, and are elongated slots. In certain embodiments, the slots are rectangular. The number and spacing of the apertures 18 are not particularly limited, provided that the total open area of all of the slots is sufficient to drain the filtrate into the outlet port 14 but is otherwise as minimal as possible in order to reduce voids. In one non-limiting embodiment, there are 45 spaced rectangular slots. Fluid that flows through the membrane is directed into the apertures 18 and flows to the outlet 14 as depicted by the arrows shown in FIG. 3.

Figure 5:
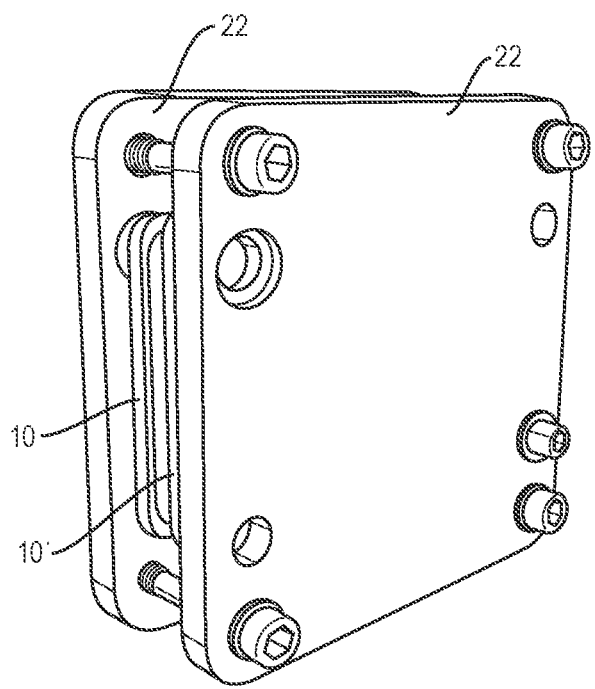
FIG. 5 is a perspective view of a plurality of flat plate devices stacked together and held by end plates in accordance with certain embodiments.

In a particular embodiment, the plate 10 is a monolithic framework having an outer substantially flat or planar border as shown. Plates 10 may be aligned and interposed between end plates 22 as shown in FIG. 5. The end caps sandwich the pair or pairs of plates 10 under pressure as is typical in the art. Together, the plates 10 end caps 22 form a substantially fixed integral stack, arranged and configured such that fluid entering the integral flat device 10 through the inlet 12 passes through the membrane or membranes 20 of each flat device 10 substantially contemporaneously (i.e., in "parallel") prior to exiting the unit 10 through its outlet 14.

In a typical arrangement, the stack of plates 10 comprises one or more pairs of filter plates, wherein in each pair, two identical plates 10, 10' (FIG. 6) are brought together and united "back to back" in register, thus creating a channel between the membrane or membranes in a first plate and the membrane or membranes in a second plate into which fluid flows from the common inlet. Thus when fluid sample is introduced into the pair or pairs of plates through a common inlet, during the conduct of a chromatography operation, fluid enters first into the channel formed between the membranes 20 of the two plates 10. The fluid then passes through, and is filtered by, the membranes 20 in each plate 10 in normal flow filtration, then flows into the combined or common outlet port. So-called "parallel flow filtration" (i.e., substantially contemporaneous flow through each component filter packet of the unit) can be accomplished by joining several of said pairs together such that all inlets and all outlets are aligned and in register. Although the use of pairs of filter plates—and thus an even number of individual plates—is preferred, those skilled in the art can appreciate that an operable fluid filtration flow path can be established using a single filter plate interposed between suitably-structured end plates. The embodiments disclosed are thus not limited to whether pairs, even numbers, or odd numbers of plates are utilized.

The device can be implemented at a relatively low cost. In particular, the device 10 can be made as a "single use" item, i.e., "single use" in the sense that at the completion of the desired (or predetermined) operation, the device can either be disposed of (e.g., as is sometimes required by law after filtering certain environmentally-regulated substances) or partially or completely revitalized or recycled (e.g., after filtering non-regulated substances).

In accordance with certain embodiments, one or more membranes 20 are bonded to the plate 10 in a filtration zone 50 distinct from the fluid inlet 12 and fluid outlet 14, and defined at least in part by the spaced ribs 17 shown in FIG. 1. In certain embodiments, the fluid inlet 12 and fluid outlet 14 are located opposite each other at far ends of the plate 10, with the filtration zone substantially centrally midway between the two. Thus, one or more membranes 20 are "framed" within the polymeric framework specifically within its filtration zone 50. In certain embodiments, a plurality of membranes 20 are stacked on one another and are framed within the polymeric framework within the filtration zone 50.

Suitable membranes include those suitable for bind/elute chromatography and including a ligand, such as a Protein A ligand, attached thereto. In certain embodiments, the membrane(s) 20 is a wet membrane that is not dryable, such as a porous hydrogel. Suitable membranes include those disclosed in U.S. Pat. Nos. 7,316,919; 8,206,958; 8,383,782; 8,367,809; 8,206,982; 8,652,849; 8,211,682; 8,192,971; and 8,187,880, the disclosures of which are hereby incorporated by reference. Such membranes include composite materials that comprises a support member that has a plurality of pores extending through the support member and, located in the pores of the support member and essentially filling the pores of the support member, a macroporous cross-linked gel. In some embodiments, the macroporous gel used is responsive to environmental conditions, providing a responsive composite material. In other embodiments, the microporous gel serves to facilitate chemical synthesis or support growth of a microorganism or cell.

Figure 4:
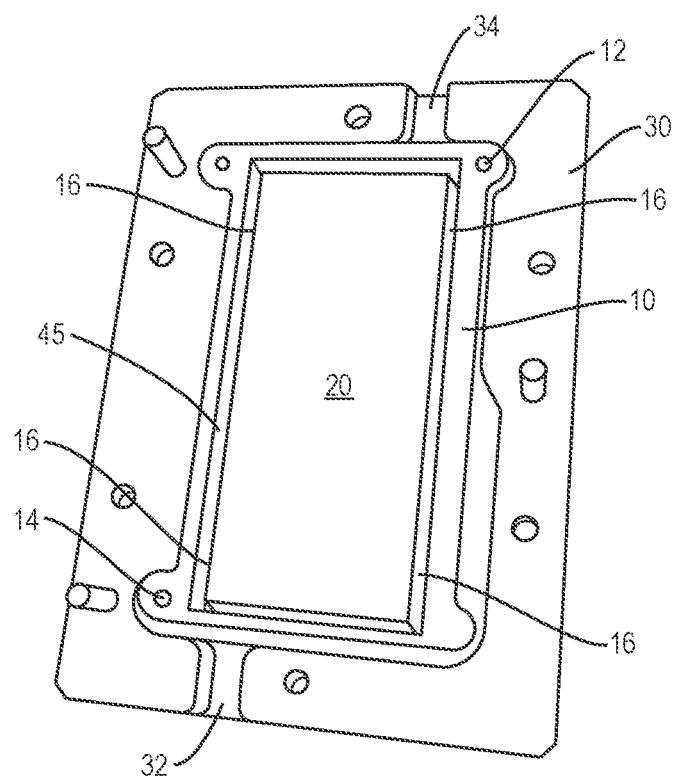
FIG. 4 is a perspective view of a flat plate device shown in a mold for bonding one or more membranes to the plate framework in accordance with certain embodiments.

In certain embodiments, the membrane or membranes 20 are adhered and sealed to the polymeric framework with an over-molding process to effectively encapsulate the membrane or membranes 20 in the framework such that all of the fluid entering the inlet of the device must pass through the membrane or membranes 20 before it reaches the outlet of the device. As shown in FIG. 4, a mold 30 may be used for doing so. A plate 10 having a membrane 20, or a stack of membranes 20 (e.g., 5 membrane sheets), positioned (with the help of alignment prongs 16) in the filtration zone 50 and over the plurality of spaced ribs 17 as shown is placed in the mold 30. Alternatively, the plate 10 without the membrane or membranes 20 in place may be first placed in the mold 30, and the membrane or membranes 20 positioned in the filtration zone 50 thereafter. In some embodiments, the plate 10 is configured such that the perimeter of the membrane or membranes 20 is surrounded by a narrow channel or groove 45 that functions as a runway for the bonding agent to flow about the perimeter of the membrane or membranes 20 during the injection molding process, prior to the bonding agent curing and sealing of the membrane or membranes 20 to the plate 10 about its perimeter.

In certain embodiments, the bonding agent is a thermoset or thermosetting plastic. Thermosets strengthen during heating, which is in contrast to thermoplastics, which soften when heated and harden and strengthen after cooling. Thermosets also retain their strength and shape when heated, again unlike thermoplastics, and exhibit excellent strength characteristics even at high temperatures. One suitable thermoset is TW062601 commercially available from EpoxySet Inc. This thermoset is a two-component encapsulating material, which cures to a hard, resilient polymer, and upon curing, adheres well to the polymeric framework of which the plate 10 may be made.

A mating mold member (not shown) may be placed on the mold 30 and secured in place, cooperating with mold member 30 to enclose the channel or groove 45. It is configured to prevent the bonding agent from flowing out of the channel or groove 45 and contaminate the membrane or membranes 20. In addition, preferably the bonding agent is chosen to have a suitable viscosity so as to minimize or prevent bleeding or protrusion into the membrane or membranes 20 during the injection molding process, yet still be injection moldable. A preferred bonding agent is a two-component medium viscosity fast gelling epoxy such as TW062601 by EpoxySet Inc.

In certain embodiments, the bonding agent is introduced into the mold such as at one end of the mold at port 32, which is in fluid communication with the groove or channel 45, and the bonding agent enters the groove or channel 45 and fills it. Any excess bonding agent may exit the mold through port or vent 34, also in fluid communication with the groove or channel 45.

Pairs of thus formed plates 10 can then be permanently bonded together such as by thermal sealing to create a water-tight assembly. Units with one or more plates 10, or one or more bonded pairs of plates 10, 10 (e.g., each pair being a "cassette") can be assembled by sandwiching the one or more pairs of plates between opposite holders or end caps 22, such as steel end caps that are suitable to restrain the forces created during a filtration operation (FIG. 5). In certain embodiments, the end caps 22 may be actuated manually or hydraulically to create the desired internal operating pressure, as is known in the art.

In another embodiment, the shrinkage/warpage issue may be resolved by choosing a thermoplastic material pair that bond together but have low shrink characteristics. Commonly used materials for similar devices in the biopharmaceutical industry include polyolefins such as polypropylene and polyethylene. These materials have shrink rates of approximately 0.015 and 0.020 inch/inch respectively. Accordingly, on a part that is 12 inches long made of polyethylene, it would shrink approximately ¼ inch after a molding operation, which would result in significant distortion of the media bed. The distorted part would have excessive void volume that would lead to lower dynamic binding capacities and lower elution concentrations. If instead, the base material were molded in a blend of polyphenylene ether (PPE) and polystyrene (e.g., NORYL resin), and a secondary molding operation to seal the membrane to the plate were carried out in a similar NORYL resin material or polystyrene (that will bond to the NORYL resin), the shrinkage would be reduced by an order of magnitude. These materials are less commonly used on devices sold into the biopharmaceutical industry because of cost and challenges associated with injection molding and material bonding operations.

Figure 10:
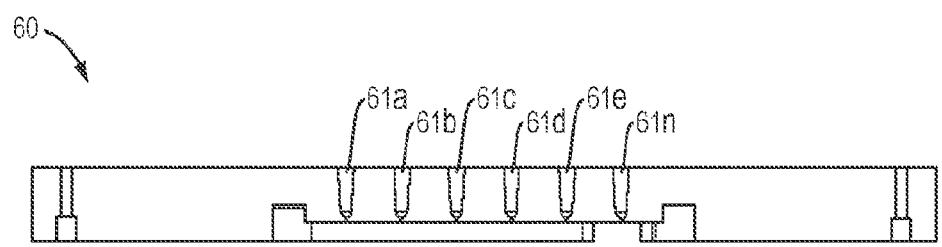
FIG. 10 is a diagram showing an injection mold with multiple gates in accordance with certain embodiments.

These technical challenges may be addressed in several ways. For example, overmolding the membrane to the plate requires a high enough injection pressure to allow the material to flow and fill the mold but with a sufficiently low "clamp force" so as to not damage or distort the membrane stack. One important technique used to enable low injection pressures and clamp forces is the employment of a large number injection gates in the mold used to do the membrane overmold. This technique is not commonly used in the assembly of commercial products because the material that fills the gate drops is wasted material and results in higher costs. However, this approach does enable a very short cycle time because the molten plastic is travelling a very short distance. This short travel distance and cycle time enables lower injection pressure and lower clamp force. FIG. 10 is an embodiment of an injection mold 60 with multiple gate drops 61a-61n going into the cavity where the membrane is overmolded. Exemplary gate spacing is 0.6 inches apart. Although six gates are shown, more or less could be used.

Plate welding for these types of devices is typically done by a contact or hotplate welding operation. The hotplate weld involves the plates to be welded coming contact with a heater (typically heated aluminum with a release coating or Teflon sheet) for some short time (seconds), the plates are separated, the heater removed and the plates are pressed together. The "open time" after the heater is removed often results in a very small welding "window" for parts made of engineered plastics such as NORYL resin because the part is cooling rapidly as soon at the heater is removed. To compensate for this, the dwell time (time attached to the heater) is increased to increase the resulting molten plastic on the part. This increased molten material becomes problematic when building a device where "void" space is reduced to a minimum. Similarly, vibration or spin welding results in excessive flash that will flow into the voids of the flow path of the device. A resolution to this is to employ a technique called RF welding. Radio Frequency (RF) welding is a method of joining thermoplastic material together using high frequency electromagnetic energy to fuse the materials. Two significant benefits of this approach for the bind and elute membrane chromatography application are:

no concern about "open time" as the parts are already in contact when the energy is applied; and No molten material or "flash" that could fill void spaces or flow channels and no need for accommodation for void space to allow this material to flow into.

Figure 11:
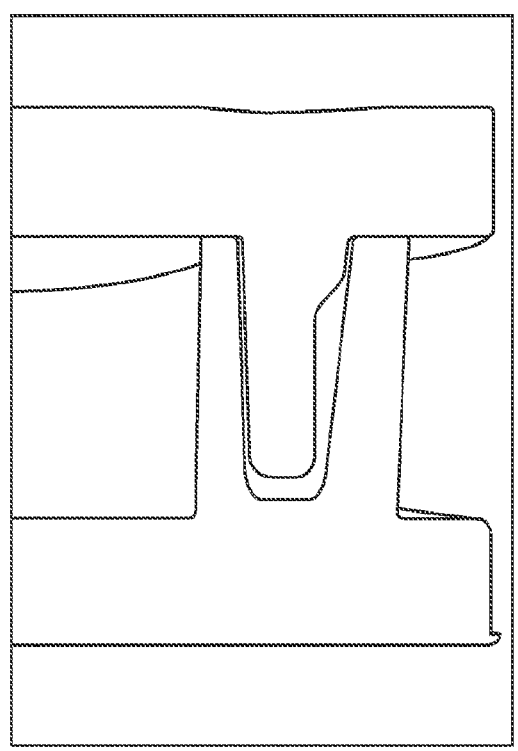
FIG. 11 is a photograph showing a tongue and groove joint welded using RF welding in accordance with certain embodiments.

FIG. 11 illustrates what the completed welded joint (tongue and groove) may look like, using, for example, an EMABOND welding process. This sample was welded using 1000 Watts of power at a frequency of 13.56 MHz for a weld time of 7 seconds. The sample was then burst tested, and reached 550 psi before bursting. The finished weld results in 2 parts (top and bottom) that are welded together to a resulting "fixed stop" that is designed into the parts. The white portions are NORYL resin, and the gray portions are an EMABOND process material that reacts to the RF field, e.g., NORYL resin impregnated with carbon steel particles (stainless steel particles may be used instead). All molten material is captured in the weld joint. There is no residual material that could occlude the permeate ports. As a result, void volume in all the channels can be minimized, resulting in a significant benefit of using this type of weld in the Bind/Elute device application.

EXAMPLE

Materials and Methods

Chromatography devices fabricated as described in this disclosure, of varying membrane volumes (MVs) ranging from 1 mL up to 112 mL, were evaluated for dynamic bind and elute chromatographic performance. Chromatographic performance of the devices was run on either an ÄKTA™ Avant 150 (GE Healthcare, Uppsala, Sweden) or a K-Prime® 40-III (EMD Millipore, MA, USA) chromatography system at a flowrate of 10 MVs/min.

The equilibration buffer used in this study was 20 mM phosphate, pH 7.0. Human gamma globulin (IgG) lyophilized powder (SeraCare Life Sciences, MA, USA, catalogue #1860-0048), was mixed with a 20 mM phosphate, 50 mM sodium chloride, pH 7.0 buffer to make an IgG solution with an IgG concentration between 2.7-3.0 g/l. IgG concentration was verified by UV absorbance at 280 nm with a UV-vis spectrophotometer. The elution buffer used in this study was 100 mM citric acid, pH 2.5.

Phosphate (monohydrate and disodium phosphate), sodium chloride, and citric acid were procured from Sigma Aldrich (St Louis, MO, USA). All solutions were filtered before use, through a 0.22 μm polyethersulfone hydrophilic filter unit (EMD Millipore, MA, USA).

Devices were equilibrated with 20 mM phosphate, pH 7.0. Then the IgG solution was loaded onto the device to at least 10% breakthrough. As the IgG solution flows through the device, the IgG binds specifically to the membrane contained in the device, while other contaminants flow through or bind nonspecifically to the membrane. Next, a wash step was performed sequentially to remove nonspecifically bound species in the device by washing the device with 20 mM phosphate buffer. Following the wash step, the specifically bound IgG of interest was recovered from the device using a 100 mM citric acid elution buffer. A final wash step using equilibration buffer followed to re-equilibrate the device.

Figure 7:
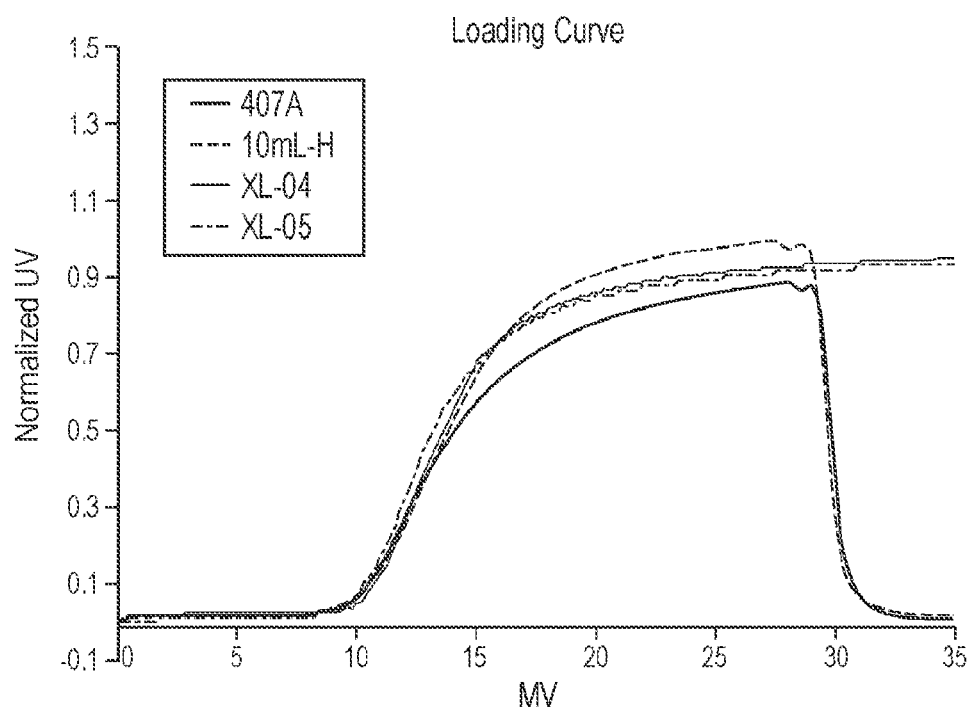
FIG. 7 is a is a loading curve (normalized UV vs. MV (membrane volume)) in accordance with certain embodiments.
Figure 8:
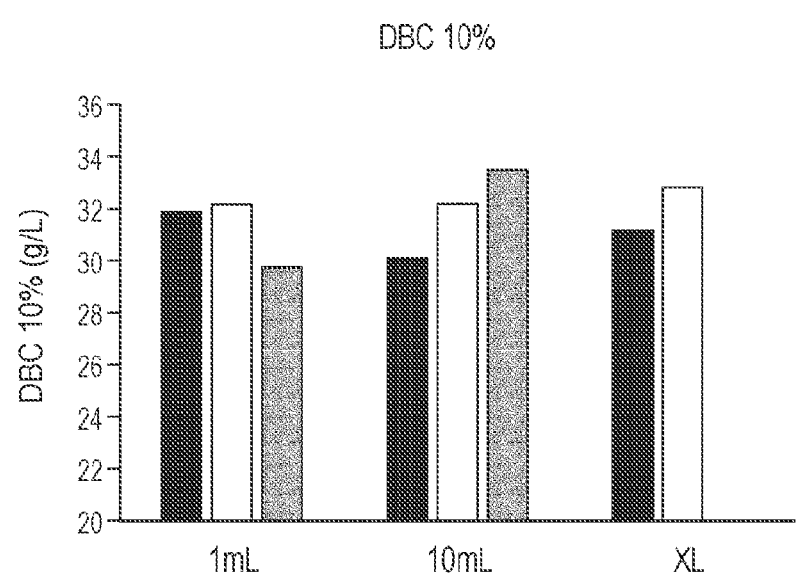
FIG. 8 is a bar graph showing dynamic binding capacity for various device volumes in accordance with certain embodiments.
Figure 9:
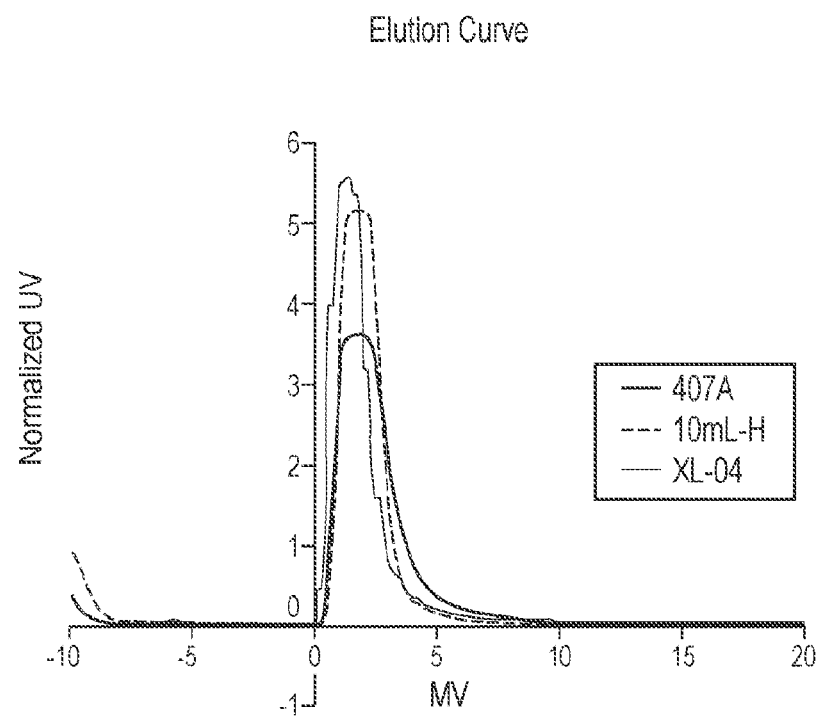
FIG. 9 is an elution curve (normalized UV vs. MV (membrane volume)) in accordance with certain embodiments.

FIGS. 7-9 illustrate the chromatographic performance in devices ranging from 1 ml (407A), to 10 ml (10 ml-H) and 112 ml (XL-04, XL-05) in volume. The breakthrough curves illustrate similar sharpness and are evidence of uniformity of flow distribution in the full range (2 orders of magnitude) of device sizes. The magnitude of the dynamic binding capacities is further support for this.

FIG. 9 shows the evaluation of the elution provides in the full range of device volumes (1 ml, 10 ml and 112 ml). There is minimal effect on the elution efficiency with a 2 order of magnitude range in device volume.

What is claimed is:

1. A filter plate having an inlet and an outlet, said filter plate disposed between two end plates, comprising a polymeric framework wherein said polymeric framework comprises a polyphenylene ether/polystyrene blend having a flat filtration zone wherein said flat filtration zone further comprises a low-shrinkage seal comprising a polystyrene material or a polyphenylene ether/polystyrene blend material, sealing a plurality of stacked membranes to said polymeric framework in said flat filtration zone, having a radio-frequency weld between the two end plates and the filter plate.

2. The filter plate of claim 1, further comprising a plurality of apertures in fluid communication with said outlet.

3. The filter plate of claim 2, wherein said apertures are positioned such that during a filtration operation, filtrate through said plurality of stacked membrane enters said apertures and flows to said outlet.

4. The filter plate of claim 1, wherein said plurality of stacked membranes is overmolded to said polymeric framework.

5. A bind and elute chromatography unit having an inlet and an outlet, and comprising at least one pair of filter plates interposed between a pair of end plates; each of said filter plates of said at least one pair of filter plates comprising a polymeric framework having a filtration zone and one or more membranes bonded to said polymeric framework in said filtration zone wherein said polymeric framework comprises a polyphenylene ether/polystyrene blend wherein said flat filtration zone further comprises a low-shrinkage seal comprising a polystyrene material or a polyphenylene ether/polystyrene blend material, sealing a plurality of stacked membranes; the filter plates of said at least one pair of filter plates being placed in back-to-back relation thereby creating a channel between the membrane or membranes in a first plate of said pair and the membrane or membranes in a second plate of said pair, into which fluid flows from said inlet and exits through said outlet after passing through the membrane or membranes in each of said first and second plates, further comprising a plurality of spaced ribs provided within said flat filtration zone to support the plurality of stacked membranes and provide flow passageways to channel fluid towards a plurality of apertures.

6. The chromatography unit of claim 5, wherein there are a plurality of stacked membranes in each of said flat filtration zones of each plate of said at least one pair of plates.

7. The chromatography unit of claim 5, wherein said pair of plates are RF welded together.

* * * * *